(12) United States Patent
Fuwa et al.

(10) Patent No.: US 8,550,802 B2
(45) Date of Patent: Oct. 8, 2013

(54) STACKED-LAYERS FORMING DEVICE

(75) Inventors: Isao Fuwa, Osaka (JP); Norio Yoshida, Nara (JP); Yoshikazu Higashi, Shiga (JP); Satoshi Abe, Osaka (JP); Masataka Takenami, Osaka (JP)

(73) Assignee: Panasonic Corporation, Osaka (JP)

( * ) Notice: Subject to any disclaimer, the term of this patent is extended or adjusted under 35 U.S.C. 154(b) by 377 days.

(21) Appl. No.: 12/988,723

(22) PCT Filed: Apr. 20, 2009

(86) PCT No.: PCT/JP2009/057875
§ 371 (c)(1),
(2), (4) Date: Jan. 3, 2011

(87) PCT Pub. No.: WO2009/131103
PCT Pub. Date: Oct. 29, 2009

(65) Prior Publication Data
US 2011/0109016 A1    May 12, 2011

(30) Foreign Application Priority Data
Apr. 21, 2008  (JP) ................................ P2008-110281

(51) Int. Cl.
*B29C 35/08*    (2006.01)

(52) U.S. Cl.
USPC .......................... 425/174.4; 425/375; 264/497

(58) Field of Classification Search
USPC .................................. 425/174.4, 375; 264/497
See application file for complete search history.

(56) References Cited

U.S. PATENT DOCUMENTS

| | | | | |
|---|---|---|---|---|
| 5,902,537 A | * | 5/1999 | Almquist et al. | 264/401 |
| 7,799,253 B2 | * | 9/2010 | Hochsmann et al. | 264/113 |
| 2002/0041818 A1 | | 4/2002 | Abe et al. | |
| 2002/0090313 A1 | * | 7/2002 | Wang et al. | 419/10 |
| 2006/0208396 A1 | | 9/2006 | Abe et al. | |
| 2008/0131104 A1 | * | 6/2008 | Philippi | 392/407 |

FOREIGN PATENT DOCUMENTS

| | | |
|---|---|---|
| JP | 2002-115004 | 4/2002 |
| JP | 2004-277881 | 10/2004 |
| JP | 2006-205456 | 8/2006 |

* cited by examiner

*Primary Examiner* — James Sanders
(74) *Attorney, Agent, or Firm* — Greenblum & Bernstein, P.L.C.

(57) ABSTRACT

There is provided a stacked-layers forming device including a powder layer-forming part for forming a powder layer, an optical device for forming a solidified layer by irradiating a predetermined portion of the powder layer with a light beam and a powder replenishing means for supplying the powder material to above a base on which the powder layer and the solidified layer are stacked or onto an upper surface of a base frame which surrounds the base. The powder replenishing means includes an approximately cylindrical member in which the powder material is charged and a screw member which is installed within the approximately cylindrical member wherein a rotation of the screw member conveys the powder material in the approximately cylindrical member. The stacked-layers forming device of the present invention enables it to not only curb its height since the powder material can be conveyed in a screw manner, but also achieve an improved cycle of the material since the powder material can be conveyed in one direction.

6 Claims, 10 Drawing Sheets

(a)　　　　　　　　　　(b)

(a)

(b)

(c)

(d)

(e)

(f)

(a)

(b)

(c)

(a)

(b)

(c)

STACKED-LAYERS FORMING DEVICE

TECHNICAL FIELD

The present invention relates to a device for manufacturing a three-dimensional shaped object. More particularly, the present invention relates to the device for manufacturing the three-dimensional shaped object with a plurality of solidified layers stacked integrally by repeating the step of forming the solidified layer by irradiating a predetermined portion of a powder layer with a light beam.

BACKGROUND OF THE INVENTION

A method for manufacturing a three-dimensional shaped object by irradiating a powder material with a light beam is known (such method can be generally referred to as "Selective Laser Sintering"). Such method can produce the three-dimensional shaped object with a plurality of solidified layers stacked integrally by repeating the step (i) of forming a solidified layer by irradiating a predetermined portion of a powder layer with a light beam, thereby allowing a sintering of the predetermined portion of the powder material or a melting and solidification thereof, and the step (ii) of forming another solidified layer by newly forming a powder layer on the resulting solidified layer, followed by similarly irradiating the powder layer with the light beam. The three-dimensional shaped object thus obtained can be used as a metal mold in a case where inorganic powder materials such as metal powder and ceramic powder are used as the powder material. While on the other hand, the three-dimensional shaped object can be used as a model or replica in a case where organic powder materials such as resin powder and plastic powder are used as the powder material. This kind of technology makes it possible to produce the three-dimensional shaped object with a complicated profile in a short period of time.

A stacked-layers forming device is used for the above selective laser sintering. In the stacked-layers forming device, the three-dimensional shaped object is produced on a base which serves as a foundation for the shaped object. Specifically, on the base of the stacked-layers forming device, the powder layer is formed and then the predetermined portion thereof is irradiated with the light beam, thereby allowing a sintering of the predetermined portion of the powder material or a melting and solidification thereof, resulting in a formation of the solidified layer. In this regard, the base is gradually lowered every time the formations of one powder layer and one solidified layer are completed. For example, see Patent Document 1.

FIGS. 14($a$) and 14($b$) show a part of the stacked-layers forming device of this kind. Such stacked-layers forming device is equipped with a forming region 104 where the powder layer and the solidified layer are formed and a powder-supplying region 105 for supplying the powder material to the forming region 104. The forming region 104 is equipped with "forming table 140 which serves as a base", "elevating/descending machine 142 which can elevate and descend the forming table 140" and "frame 141 for the forming table, which surrounds the forming table 140". On the other hand, the powder-supplying region 105 is equipped with "storage tank 151 for storing powder material", "elevating/descending mechanism 152 and elevating/descending table 150 for giving a lift to a powder material of the storage tank 151" and "powder-supplying blade 120 for transferring the top portion of the powder material of the storage tank 151 toward the forming table 140, while leveling the surface of the transferred powder material on the forming table 140".

As for such stacked-layers forming device, the predetermined portion of the powder layer is subjected to a sintering or a melting and subsequent solidification to form the solidified layer, and subsequently the forming table 140 is lowered for newly forming a further powder layer and a further solidified layer. Upon forming the powder layer, the elevating/descending table 150 is slightly lifted so that the top portion of the powder material of the storage tank 151 is located higher than the upper surface of the frame 141, and thereafter the powder-supplying blade 120 is forced to slide for pushing the powder material on the elevating/descending table 150 toward the forming table 140.

PATENT DOCUMENTS

[Patent document 1] Japanese Unexamined Patent Publication (Kokai) No. 2002-115004.

DISCLOSURE OF THE INVENTION

Problems to be Solved by the Invention

With respect to the above-mentioned stacked-layers forming device, a height H of the powder-supplying region 105 can be more than twice the height H1 of the storage tank 151. This leads to a larger size of the device (see FIG. 14($b$)).

Furthermore, as for the above-mentioned stacked-layers forming device, an upper portion of the powder material of the storage tank 151 is sequentially transferred toward the forming table 140. In this regard, when a new powder material is replenished onto the top of the powder material in the storage tank 151, then the lower portion of the powder material in the storage tank 151 can fall into disuse, causing a deteriorated cycle of the material. This causes a less accurate formation of the resulting solidified layers since there may be exist not only "oxidated material" but also "non-oxidated material" in the powder material, especially in a case where a readily-oxidated material is used as the powder material for example.

Under the above circumstances, the present invention has been created. Thus, an object of the present invention is to provide a stacked-layers forming device with the capability of its miniaturization, and equipped with a powder replenishing means with a satisfactory cycle of the material.

Means for Solving the Problems

In order to achieve the above object, the present invention provides a stacked-layers forming device for manufacturing a three-dimensional shaped object, comprising:

a powder layer forming means for forming a powder layer of a powder material; and a solidified layer forming means for forming a solidified layer by irradiating a predetermined portion of the powder layer with a light beam, thereby allowing a sintering of the powder material in said predetermined portion or a melting and solidification thereof;

wherein the three-dimensional shaped object with a plurality of the solidified layers stacked integrally is fabricated by repeating the step of forming the powder layer by means of the powder layer forming means and the step of forming the solidified layer by means of the solidified layer forming means;

the device further comprising a powder replenishing means for supplying/replenishing the powder material to above a base on which the powder layer and the solidified layer are stacked or onto an upper surface of a base frame which surrounds a perimeter of the base;

wherein the powder replenishing means comprises an approximately cylindrical member in which the powder material is charged and a screw member which is installed within the approximately cylindrical member, wherein a rotation of the screw member conveys the powder material in the approximately cylindrical member.

For one thing, the present invention is characterized in that the powder replenishing means with the screw member installed within the approximately cylindrical member supplies the powder material.

As used in this description and claims, the term "base" substantially means a member or part serving as a foundation for the shaped object to be formed. As used in this description and claims, the phrase "approximately cylindrical member" substantially means a member having an internal hollow portion therein, the member being at least equipped with a powder material inlet and a powder material outlet which are in communication with the internal hollow portion. For example, the approximately cylindrical member may be a barrel member. Furthermore, as used in this description and claims, the phrase "approximately perpendicular" substantially means an embodiment wherein an angle between one direction and the other direction is in the range of preferably from 80° to 100°, more preferably from 85° to 95° (for example 90°).

In one preferred embodiment of the present invention, the powder layer forming means comprises a slide member which is provided slidably along the upper surface of the base frame. The slide member is capable of conveying the powder material, which has been supplied from the powder replenishing means, to a space/region surrounded by the base frame and the upper surface of the base, while leveling the surface of the conveyed powder material.

It is preferred that the slide member further comprises a cover part for capping the upper surface of the base. It is also preferred that the slide member further comprises a powder-supply frame which surrounds a region to which the powder material is to be supplied, the frame being capable of being arranged above the base or on the upper surface of the base frame. In this case, the powder-supply frame preferably comprises a lid member for covering an interior thereof wherein a powder material outlet provided in the edge portion of the approximately cylindrical member is preferably in communication with the interior of the powder-supply frame.

In one preferred embodiment of the present invention, the powder replenishing means is provided movably in a direction approximately perpendicular to a sliding direction of the slide member. In this case, the powder material is preferably supplied via an outlet provided in the edge portion of the approximately cylindrical member.

In one preferred embodiment of the present invention, a powder outlet opening is provided in a barrel of the approximately cylindrical member of the powder replenishing means, and thus the powder material is supplied via such powder outlet opening. In other words, according to this embodiment, the outlet opening for powder material is provided in the body portion of the approximately cylindrical member, not in the edge portion thereof. For example, the powder outlet opening may be in a form of "a plurality of openings" or "slit opening" which is provided in the barrel portion of the approximately cylindrical member.

In one preferred embodiment of the present invention, the powder replenishing means comprises a powder outlet opening provided in the barrel portion (body portion) of the approximately cylindrical member, and a covering member which is capable of opening and closing the powder outlet opening. In this case, the powder material can be supplied through the opening and closing of the powder outlet opening by actuating the covering member.

It is preferred that the stacked-layers forming device of the present invention further comprises a mechanism for transferring the powder material, which has been supplied to above the base or onto the upper surface of the base frame, in a direction approximately perpendicular to a sliding direction of the slide member. For example, the stacked-layers forming device of the present invention is preferably equipped with "slide mechanism for transferring the powder material in a direction approximately perpendicular to a sliding direction of the slide member", "conveyor mechanism for transferring the powder material in a direction approximately perpendicular to a sliding direction of the slide member" or "screw mechanism for transferring the powder material in a direction approximately perpendicular to a sliding direction of the slide member".

Effect of the Invention

The stacked-layers forming device of the present invention enables it to curb its height since the powder material is supplied or replenished in a screw manner. Accordingly, the stacked-layers forming device of the present invention has a more compact size, as compared to the prior-art stacked-layers forming device. For instance, the height of the stacked-layers forming device of the present invention is about 0.3 to 0.7 times the height of the prior-art stacked-layers forming device (e.g. height of the prior-art device as shown in FIG. 14). Moreover, according to the stacked-layers forming device of the present invention, the powder material is conveyed in one direction within the approximately cylindrical member, followed by being supplied to a region above the base or onto the upper surface of the base frame, which leads to an achievement of an improved cycle of the material. In other words, even in a case where a readily-oxidated material is used as the powder material, the less accurate formation of the solidified layers can be prevented.

In a case where the powder layer forming means comprises the slide member, the powder layer with the leveled surface thereof is formed on the base.

In a case where the slide member comprises the cover part, such cover part can inhibit a contact of the powder layer with an ambient air, and thereby an unsatisfactory formation of the solidified layer, which is attributable to the oxidation of the powder material, can be prevented.

In a case where the slide member comprises the powder-supply frame, the powder material can be supplied to a limited region which is surrounded by the powder-supply frame. Thus, a spatter or scatter of the powder material onto the upper surface of the base frame can be prevented, and thereby an efficient supply of the powder material to the base is achieved.

In a case where the powder replenishing means is provided movably in a direction approximately perpendicular to a sliding direction of the slide member, the powder material can be supplied to a desired region, and thereby a reduction of an excess amount of the powder material is achieved.

In a case where the powder-supply frame comprises a lid member, a closure of the internal space of the powder-supply frame is achieved, and thereby the spatter or scatter of the powder material can be effectively prevented.

In a case where the powder material is supplied via the powder outlet opening (e.g. "a plurality of openings" or "slit opening") provided in the barrel of the approximately cylindrical member, or in a case where the powder material is supplied through the opening and closing of the powder outlet opening of the barrel by actuating the covering member, a wide spread of supply of the powder material with respect to the region above the base or the upper surface of the base frame is achieved without moving the powder replenishing means.

In a case where the stacked-layers forming device is equipped with the mechanism for transferring the powder material in a direction approximately perpendicular to a sliding direction of the slide member (for example, slide mechanism, conveyor mechanism or screw mechanism), a wide spread of the uniform supply of the powder material with respect to the region above the base or the upper surface of the base frame is achieved without moving the powder replenishing means.

BEST MODES FOR CARRYING OUT THE INVENTION

The present invention will be hereinafter described in more detail with reference to the accompanying drawings.

First Embodiment

Figure 1:
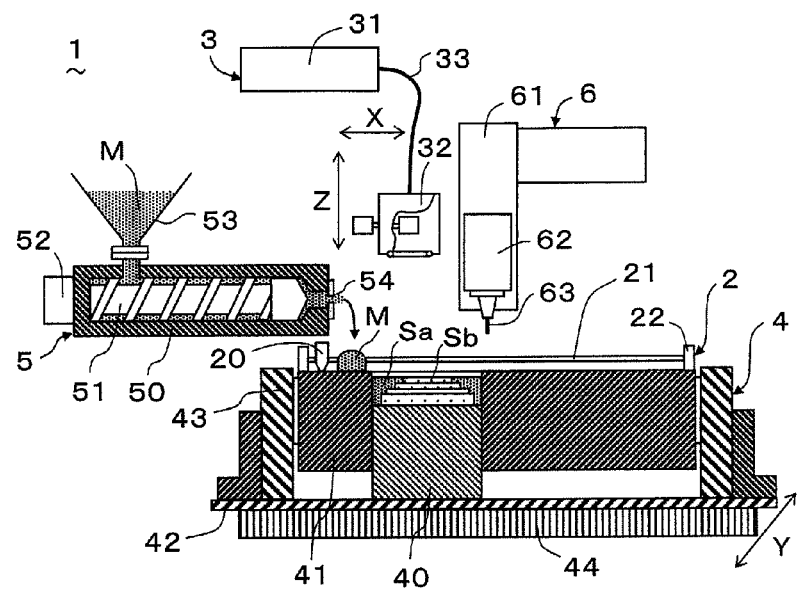
FIG. 1 is a partial sectional side view of stacked-layers forming device according to the first embodiment of the present invention.
Figure 2:
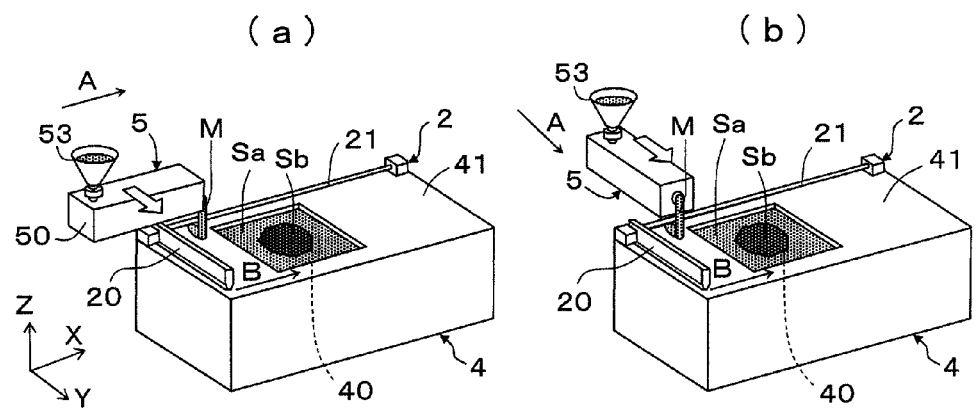
FIGS. 2(a) and 2(b) are perspective views of stacked-layers forming device according to the first embodiment of the present invention.

With reference to FIG. 1 as well as FIGS. 2(a) and 2(b), a stacked-layers forming device according to the first embodiment of the present invention will be now described. According to the first embodiment, the stacked-layers forming device 1 mainly comprises a powder layer forming means, a solidified layer forming means and a powder replenishing means. The powder layer forming means comprises a powder layer-forming part 2 for forming a powder layer Sa of an inorganic or organic powder material M. The solidified layer forming means comprises an optical device 3 used for forming a solidified layer Sb by irradiating a predetermined portion of the powder layer Sa with a light beam L, and thereby allowing a sintering of the powder material or a melting and solidification of the powder material. The powder replenishing means comprises "forming region 4 equipped with a base 40 (on which the powder layer Sa and the solidified layer Sb are formed) and a base frame 41 (which surrounds a perimeter of the base 40)" and "powder replenishing means 5 for supplying the powder material M to above the base 40 (on which the powder layer Sa and the solidified layer Sb are formed) or onto an upper surface of the base frame 41". It is preferred that the stacked-layers forming device 1 further comprises a milling machine 6 for machining the periphery of the three-dimensional shaped object having the integrally stacked solidified layers. Incidentally, as for the optical device 3, the forming region 4 and the milling machine 6, apart of them is omitted in FIGS. 2(a) and 2(b).

The powder layer-forming part 2 comprises "slide member 20 which is provided slidably along the upper surface of the base frame 41", "horizontal rail 21 which is provided in parallel with the upper surface of the base frame 41" and "actuator part 22 for slide member, which drives the slide member 20 to slidably move along the horizontal rail 21". The bottom surface of the slide member 20 is approximately in contact with the upper surface of the base frame 41, and the drive power of the actuator part 22 enables the slide member 20 to move along the horizontal rail 21. The movement of the slide member 20 pushes the powder material M in the moving direction of the slide member, the powder material having been supplied from the powder replenishing means 5 onto the upper surface of the base frame 41.

The optical device 3 comprises "light source 31 equipped with laser generator", "scanning mechanism 32 equipped with a collecting lens and a Galvanometer mirror or the like for scanning the irradiating light beam L" and "optical fiber 33 which interconnects the light source 31 and the scanning mechanism 32". As the light source 31, carbon dioxide laser, Nd:YAG laser or the like is used in a case where the powder material M contains iron powder, for example. The optical device 3 is provided movably in X and Z directions as shown in FIG. 1.

In addition to the base 40 and the base frame 41, the forming region 4 comprise "table 42 for securing the base 40", "elevating/descending machine 43 for elevating and descending the base frame 41" and "pedestal 44 capable of moving the table 42 in a Y direction as shown in FIG. 1". Since the base 40 is secured to the table 42, the lifting of the base frame 41 by means of the elevating/descending machine 43 forms a space above the base 40, the space being surrounded by the base frame 41. This space corresponds to a space for accommodating the replenished powder material M.

The powder replenishing means 5 comprises "approximately cylindrical member 50 in which the powder material M is charged", "screw member 51 which is installed within the approximately cylindrical member 50", "actuator part 52 which actuates the screw member 51 to rotate" and "storage tank 53 which is connected to one edge portion of the approximately cylindrical member 50, and thus capable of supplying the powder material M into the approximately cylindrical member 50". When the screw member 51 is actuated to rotate by the actuator 52, the powder material M which has been charged in the approximately cylindrical member 50 is forced to move toward the other end portion of the approximately cylindrical member 50, the other end portion being not connected to the storage tank 53. With regard to the arrangement of the powder replenishing means 5, particularly the orientation of the means 5, the powder replenishing means 5 is at least required to be oriented such that the axis direction A of the screw member 51 is approximately parallel to the sliding direction B of the slide member 20, as shown in FIG. 2(a). Alternatively, the powder replenishing means 5 may be oriented such that the axis direction A of the screw member 51 is approximately perpendicular to the sliding direction B of the slide member 20, as shown in FIG. 2(b).

In the powder replenishing means 5, the powder material outlet 54 is preferably provided at the edge portion of the approximately cylindrical member 50, in which case the powder material M is discharged from such outlet 54 to the outside. It is preferred that the powder replenishing means 5 is provided movably in a direction approximately perpendicular to a sliding direction of the slide member 20. In this case, the powder replenishing means 5 is capable of supplying the powder material M from the outlet 54 to above the base 40 or onto the upper surface of the base frame 41, while moving in a direction approximately perpendicular to the sliding direction of the slide member. In a particularly preferred embodiment, the powder replenishing means 5 is capable of supplying the powder material M to the upper surface of the base frame 41 between the base 40 and the slide member 20.

The milling machine 6 comprises "headstock 61 which is at least capable of a three-axis controlling of the table 42", "spindle head 62 attached to the headstock 61" and "end mill 63 for machining the periphery of the three-dimensional shaped object having the integrally stacked solidified layers Sb". The headstock 61 is configured to move the spindle head 62 in X and Z directions shown in FIG. 1. Preferably, there is provided a mechanism for automatically exchange the end mill 63. As the end mill 63, a twin-bladed type ball end mill with superhard material therein may be used. A square end mill, a radius end mill, drill or the like may also be used according to an intended shape or an object of the milling process. Incidentally, the scanning mechanism 32 of the optical device 3 may be configured to be removably attached to the side of the spindle head 62 of the milling machine 6, or be attached thereto instead of the end mill 63 (not shown).

Figure 3:
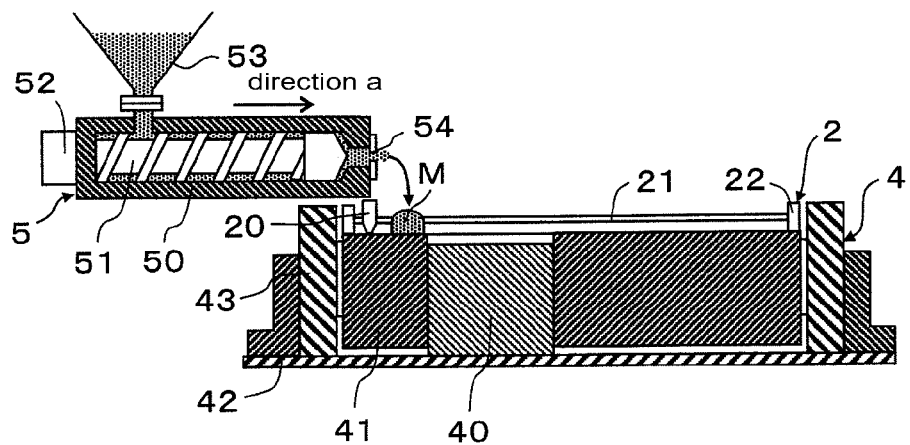
FIGS. 3A(a) to 3A(c) are partial sectional side views showing performed operations of stacked-layers forming device according to the first embodiment of the present invention.
FIGS. 3B(d) to 3B(f) are partial sectional side views showing performed operations of stacked-layers forming device according to the first embodiment of the present invention.
Figure 3:
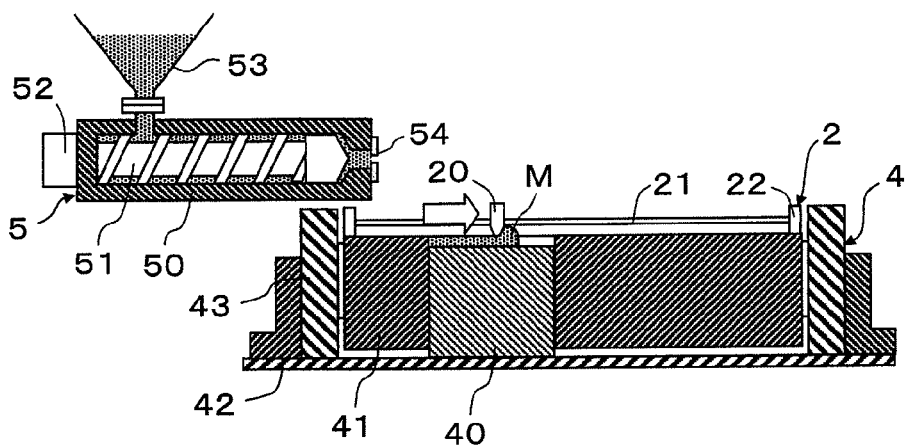
Figure 3:
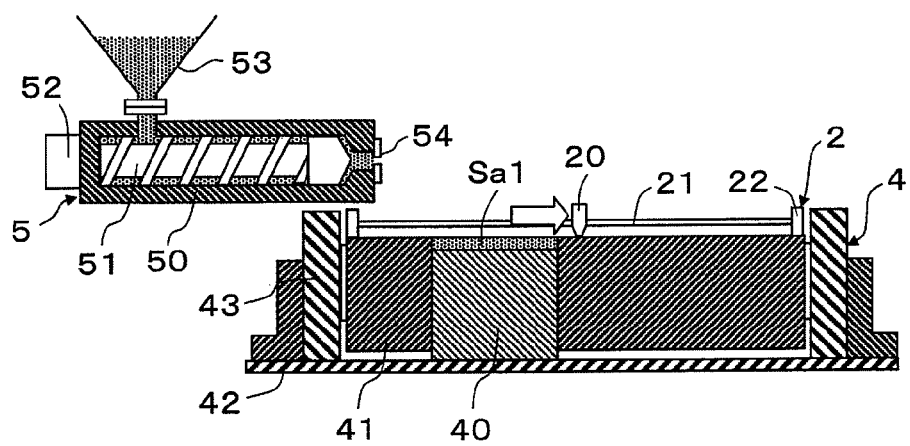
Figure 3:
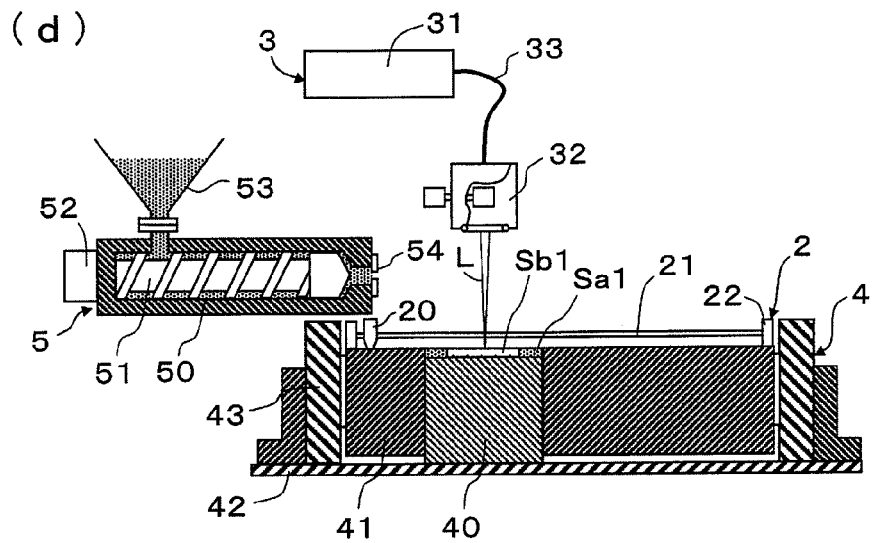
Figure 3:
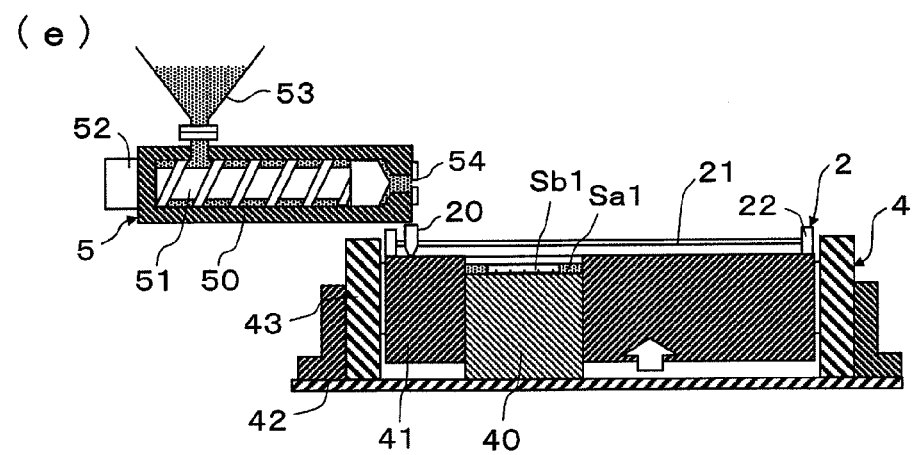
Figure 3:
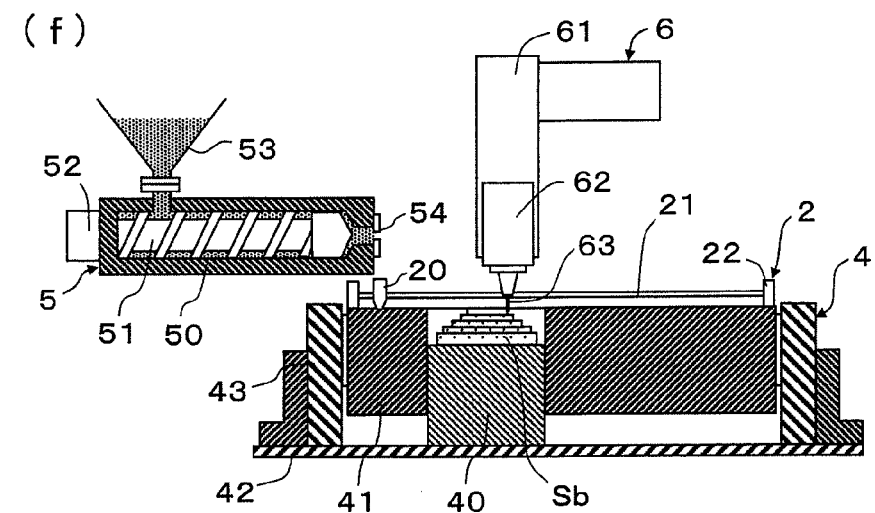

Next, the performed operations of the stacked-layers forming device 1 will be described with reference to FIGS. 3(a) to 3(f). First, it is required to keep the upper surface of the base 40 slightly lowered with respect to the upper surface of the base frame 41 (see FIG. 3(a)). Subsequently, the actuator 52 is driven to rotate the screw member 51. The rotation of the screw member 51 transfers the powder material M charged in the storage tank 53 toward the interior of the approximately cylindrical member 50, and then conveys the powder material M in the direction "a" shown in FIG. 3(a) within the approximately cylindrical member 50. Finally, the rotation of the screw member 51 functions to discharge the powder material M from the approximately cylindrical member 50 so that the powder material M is supplied onto the upper surface of the base frame 41. More specifically, the powder material M is discharged from the approximately cylindrical member 50 so that the powder material M is supplied to a region between the base 40 and the slide member 20, as shown in FIG. 3(a). Next, as shown in FIG. 3(b), the slide member 20 is actuated to slidably move along the upper surface of the base frame 41. The sliding movement of the slide member 20 conveys the powder material M toward the base 40. In this regard, the sliding movement of the slide member 20 above the base 40 can function to level the surface of the conveyed powder material M, and thereby the first powder layer Sa1 is formed as shown in FIG. 3(c). The slide member 20 may have any suitable forms as long as the member 20 is capable of pushing and conveying the powder material M while leveling the surface of the conveyed powder material M on the base 40. In other words, the form of the slide member 20 is not necessarily limited to a blade form as shown in FIG. 1 as long as the slide member 20 has a longer width than that of the base 40. In terms of preventing the ununiform distribution of the pushed powder material M along the width direction of the slide member 20, a sliding part of the member 20 preferably has a concave-convex surface/corrugated surface. Also in terms of preventing an unleveled surface of the powder layer Sa, which may be caused by the hindrance attributable to the excess powder to the sliding movement of the slide member 20, the base frame 41 may be provided with a collecting part (not shown) for collecting the excess amount of the powder.

Subsequent to the formation of the powder layer, the operation of the optical device 3 is initiated. Specifically, a predetermined portion of the powder layer is irradiated with a light beam L by means of the optical device 3 to allow a sintering of the powder material in such predetermined portion or a melting and solidification of the powder material in such predetermined portion. This leads to a formation of the first solidified layer Sb1 in the light-beam irradiated portion (see 3(d)).

It is preferred that a scanning path (hatching path) of the light beam L is determined in advance by using a 3-D CAD data of the stacked-layers shaped object. In other words, the scanning path of the light beam L for each layer is preferably obtained in advance by means of the contour shape data of each of sliced sections of the object, such sliced sections being a regularly-pitched sliced sections of STL (Standard Triangulation language) data produced from 3-D CAD model. In a case where a metal powder is used as the powder material and thus the solidified layer corresponds to a sintered layer, it is preferred that the solidification/sintering of the layer is performed so that an outermost surface of the shaped object has a higher density (porosity of less than 5%) whereas the interior of the shaped object has a lower density. Namely, it is preferred that data of the shaped model is divided into sub-data for surface region and sub-data for interior region, and then the interior region is irradiated with the light beam L under such a sintering condition that a porous portion is formed whereas the surface region is irradiated with the light beam L under such a sintering condition that a high-density portion is formed due to an approximately complete melting of the powder. By so doing, there is finally obtained the three-dimensional shaped object with its densified surface.

After the formation of the solidified layer, as shown in FIG. 3(e), the base frame 41 is lifted to a predetermined height by means of the elevating/descending machine 43. Thereafter, the powder material M is again supplied to the upper surface of the base frame 41 (see FIG. 3(a)). The lifted height of the base frame 41 corresponds to a thickness of the second powder layer Sa2 which is formed on the first powder layer Sa1 and the first solidified layer Sb1. For example, each thickness of the powder layers Sa or each thickness of the solidified layers Sb may be about 0.05 mm in a case where the metal mold for molding is fabricated as the shaped object. The repeating of the formations of the powder layers Sa and the solidified layers Sb results in a production of the three-dimensional shaped object wherein a plurality of the solidified layers are stacked integrally.

When a total thickness of the stacked solidified layers Sb reaches a predetermined value obtained based on a tool length of the end mill 63 of the milling machine 6 by repeating the steps of FIGS. 3(a) to 3(e), then a machining process is initiated. Upon the machining process, the milling machine 6 is forced to move toward the region above the forming region 4, and thereafter the periphery of the shaped object with the integrally stacked layers is machined by means of the end mill 63. As with the scanning path of the light beam L, a machining path of the milling machine 3 is also determined in advance by using a 3-D CAD data of the stacked-layers shaped object. The machining process can remove the extra portion of the solidified layers (such extra portion being attributable to the powder attached to the surface of the three-dimensional shaped object), which leads to an achievement of a satisfactory exposure of high-density surface of the three-dimensional shaped object. After the completion of the machining process, the formations of the powder layers Sa and the solidified layers Sb are again repeated. Incidentally, the stacked-layers forming device 1 is preferably equipped with a dust-eliminating means (not shown) composed of air pump, suction nozzle and the like. In this case, the dust-eliminating means may be actuated prior to and/or subsequent to the machining process using the milling machine 6. Namely, the unsintered extra powder may be eliminated for the purpose of improving a machining accuracy prior to the machining process using the milling machine, and also the machine powder produced due to the machining process using the milling machine may be eliminated thereafter. Preferably, the dust-eliminating means has a plurality of suction nozzles respectively disposed for the intended purposes such as the elimination of the unsintered extra powder and the elimination of the machine powder. In this case, the unsintered extra powder and the machine powder are individually collected. More preferably, such collected powder is returned to the storage tank 53.

Through the above-mentioned performed operations, the desired three-dimensional shaped object can be finally obtained.

According to the first embodiment of the present invention, the powder material M can be horizontally supplied in a screw manner. This leads to an achievement of the curbed height of the stacked-layers forming device. In other words, the stacked-layers forming device of the present invention has a more compact size, as compared to the prior-art device. Moreover, according to the first embodiment of the present invention, the powder material M stored in the bottom of the storage tank 53 is conveyed in one direction through the interior of the approximately cylindrical member 50 so that the powder material M is supplied to above the base 40 or onto the upper surface of the base frame 41. This leads to a prevention of the disuse of the powder material M of the storage tank 53, and thereby a satisfactory cycle of the material is achieved.

Furthermore, according to the first embodiment of the present invention, the supplied amount (replenished amount) of the powder material M can be suitably adjusted by controlling a rotating speed of the screw member 51. It should be noted that the supplied amount of the powder material M is not always constant during the manufacturing of the shaped object. For example, when the excess powder of the powder layer Sa is eliminated prior to the machining process using the milling machine 6, a larger replenished amount of the powder is needed after such machining process as compared to the case where the formations of the powder layers Sa and the solidified layers Sb are successively repeated without the machining process. In other words, the adjustment regarding the supplied amount of the powder material M can be made as necessary according to the manufacturing steps, which leads to an achievement of a suitably supplied amount of the powder material M.

In a case where the three-dimensional shaped object to be manufactured has a small size, namely in a case where the area of the powder layer to be irradiated with the light beam L (i.e. the area to be sintered) is relatively small, it may be enough to supply the powder material M to only such small area. In this regard, the present invention can meet such kinds of needs. Specifically, the supply of the powder material can be performed while moving the powder replenishing means 5 in a direction approximately perpendicular to the sliding direction of the slide member 20, in which case the powder material can be supplied to the intended area along the moving direction of the means 5. In this way, the preset invention can supply the powder material M only to a predefined region, and thereby a reduction of the excess amount of the powder material is achieved.

Second Embodiment

Figure 4:
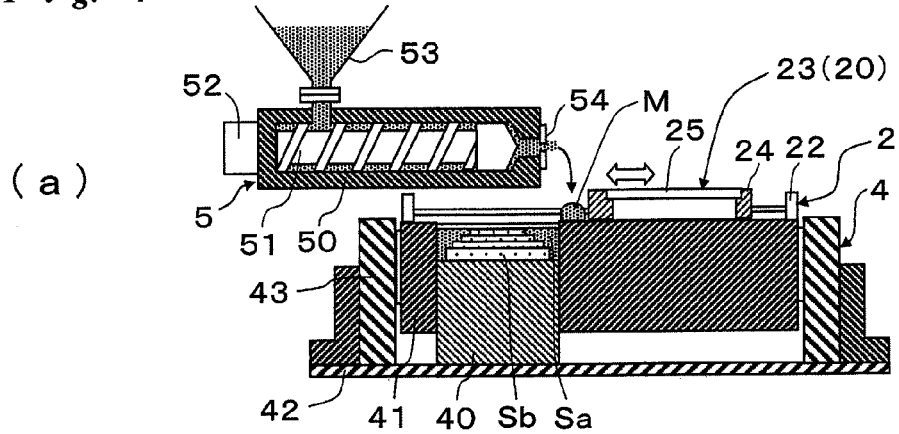
FIGS. 4(a) and 4(c) are partial sectional side views of stacked-layers forming device according to the second embodiment of the present invention.
FIG. 4(b) is a perspective view of stacked-layers forming device according to the second embodiment of the present invention.
Figure 4:
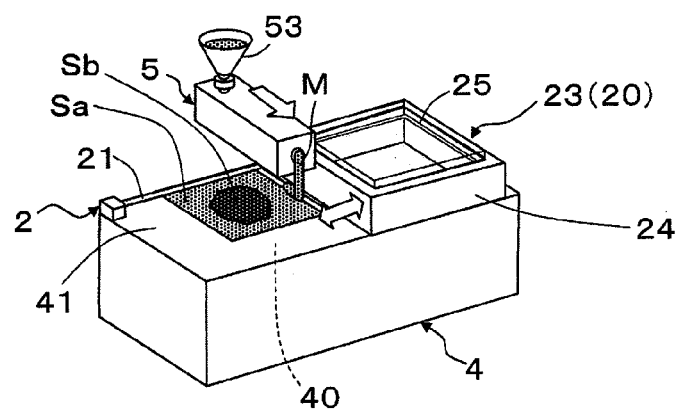
Figure 4:
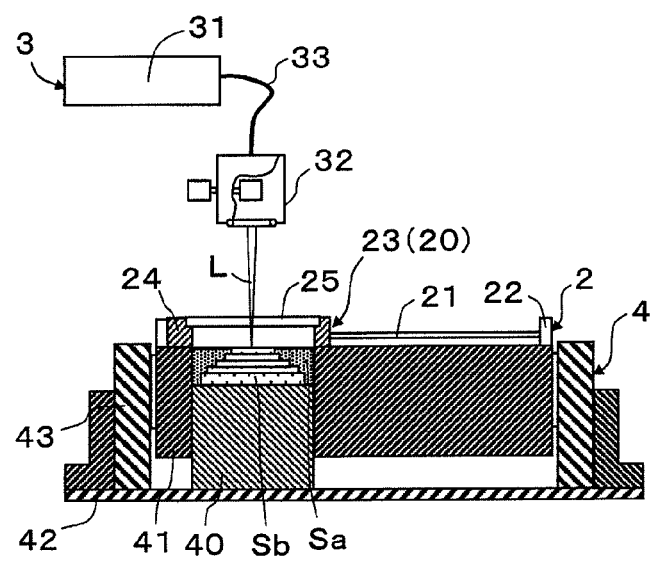

With reference to FIGS. 4(a) to 4(c), a stacked-layers forming device according to the second embodiment of the present invention will be now described. In the stacked-layers forming device 1 according to the second embodiment, the slide member 20 is equipped with a cover part 23 for capping the upper surface of the base 40. It is preferred that the cover part 23 comprises "frame 24 with its opening area (bottom-sided opening area) being larger than the upper surface area of the base 40" and "window 25 which is provided on the upper side of the frame 24, and is capable of transmitting the light therethrough". The other constructions or components of the stacked-layers forming device according to the second embodiment of the present invention is substantially the same as those of the first embodiment.

As is often the case with the solidification (e.g. sintering) performed by the irradiation of the powder layer Sa with light beam L, the powder layer Sa may be oxidated due to the contact thereof with an ambient air, depending on the kinds of the powder material. This causes an unsatisfactory formation of the solidified layer. In this regard, according to the second embodiment, a cover part 23 is disposed above the base 40 so that the space enclosed by the cover part 23 and the base 40 is filled with an inert atmosphere gas (e.g. nitrogen and/or argon), in which case the irradiation of the powder layer with the light beam L can be conducted under an inert atmosphere (see FIG. 4(c)). The cover part 23, in this case, can inhibit the contact of the powder layer Sa with the ambient air, and thereby an unsatisfactory formation of the solidified layer (e.g. unsatisfactory formation of the sintered layer), which is attributable to the oxidation of the powder material M, can be prevented. It is preferred that a gas generator of an inert atmosphere gas (not shown) is connected to the side of the frame 24 of the cover part 23. It is also preferred that an oxygen meter (not shown) is provided to measure the oxygen level in the enclosed space A within the cover part 23. In this case, only when the oxygen level of the enclosed space A exceeds a predetermined oxygen level, then a fresh inert gas is supplied into the enclosed space A.

The window 25 of the cover part 23 is preferably made of a silica glass in a case where the light beam L is a YAG laser. While on the other hand, the window 25 of the cover part 23 is preferably made of a zinc selenide or the like in a case where the light beam L is a carbon dioxide gas laser. The window 25 may be not only in a form of a parallel plate, but also in a form of fθ lens. The window 25 having a form of fθ lens can form a constant diameter of the sintered area irradiated with the light beam L, which leads to an improved accurate formation of the solidified layers.

According to the second embodiment of the present invention, when the cover part 23 slidably moves along the upper surface of the base frame 41, the outer surface of the frame 24 of the cover part 23 serves to transfer the powder material M to a space or region enclosed by the base frame and the upper surface of the base, while leveling the surface of the transferred powder material (see FIG. 4(a)). As shown in FIG. 4(b), the powder replenishing means 5 is preferably provided such that an axial direction of the screw member 51 is approximately perpendicular to a sliding direction of the cover part 23. However, the axial direction of the screw member 51 may be approximately parallel to a sliding direction of the cover part 23 as long as the powder replenishing means 5 is provided movably in a direction approximately perpendicular to a sliding direction of the cover part 23 (see FIG. 2(a)).

Third Embodiment

Figure 5:
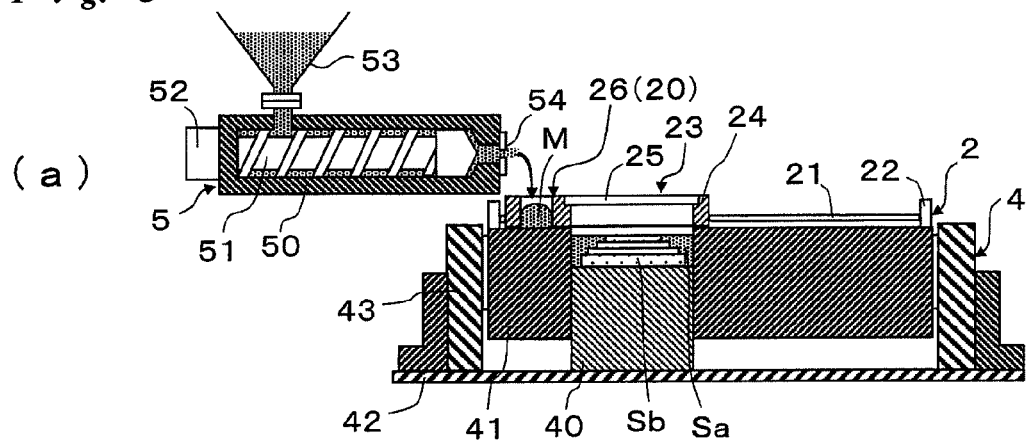
FIGS. 5(a) and 5(c) are partial sectional side views of stacked-layers forming device according to the third embodiment of the present invention.
FIG. 5(b) is a perspective view of stacked-layers forming device according to the third embodiment of the present invention.
Figure 5:
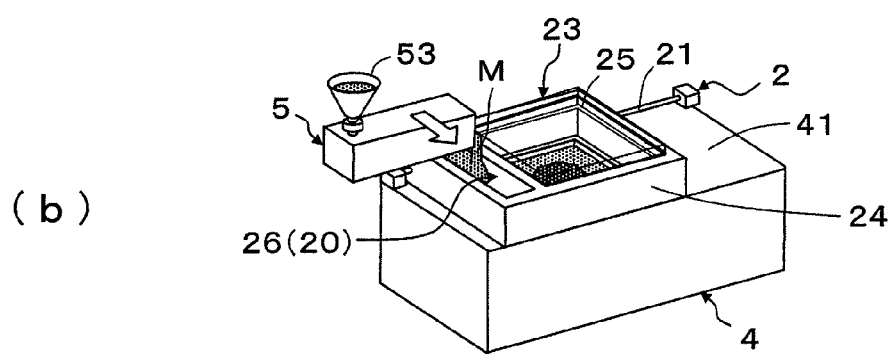
Figure 5:
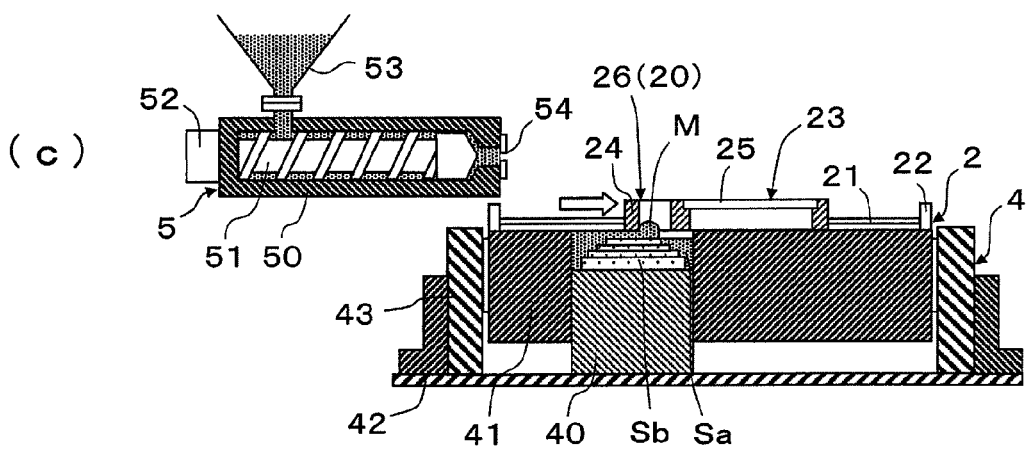

With reference to FIGS. 5(a) to 5(c), a stacked-layers forming device according to the third embodiment of the present invention will be now described. In the stacked-layers forming device 1 according to the third embodiment, the slide member 20 is equipped with a powder-supply frame capable of surrounding a region to which the powder material M is to be supplied, the region being located above the base 40 or on the upper surface of the base frame 41. FIGS. 5(a) to 5(c) show an embodiment wherein the cover part 23 is integrated with the powder-supply frame 26. The present invention, however, is not necessarily limited to this embodiment. The cover part 23 may be formed separately from the powder-supply frame 26. Alternatively, only the powder-supply frame 26 may be used. The other configurations/constructions of the third embodiment of the present invention are similar to those of the first embodiment and the second embodiment.

According to the third embodiment of the present invention, the powder material M can be supplied to a limited region which is surrounded by the powder-supply frame 26, the limited region being a portion of the region above the base 40 or a portion of the upper surface of the base frame 41. Thus, the spatter or scatter of the powder material M onto to the upper surface of the base frame 41 can be prevented, and thereby an efficient supply of the powder material M is achieved.

Figure 6:
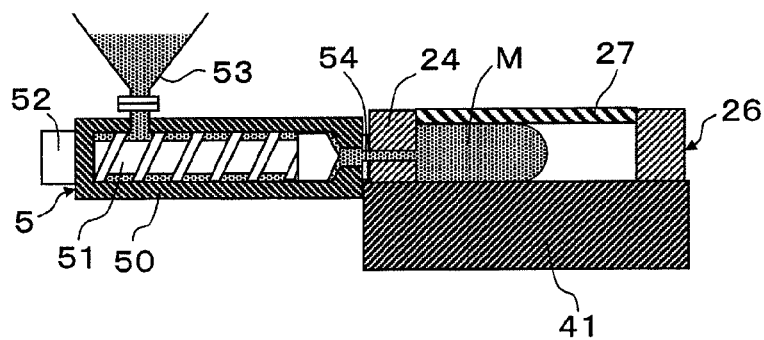
FIG. 6 is a modified example of a partial sectional side view of stacked-layers forming device according to the third embodiment of the present invention.

According to a modified example of the third embodiment, as shown in FIG. 6, the powder-supply frame 26 comprises a lid member 27 therein (particularly in the upper portion of the frame) in which case the powder material outlet 54 provided in the end of the approximately cylindrical member 50 is in communication with the interior of the powder-supply frame 26. This modified example of the third embodiment can achieve a closure of the interior of the powder-supply frame 26, which leads to an efficient prevention of the supplied powder material M from spattering or spattering.

Fourth Embodiment

Figure 7:
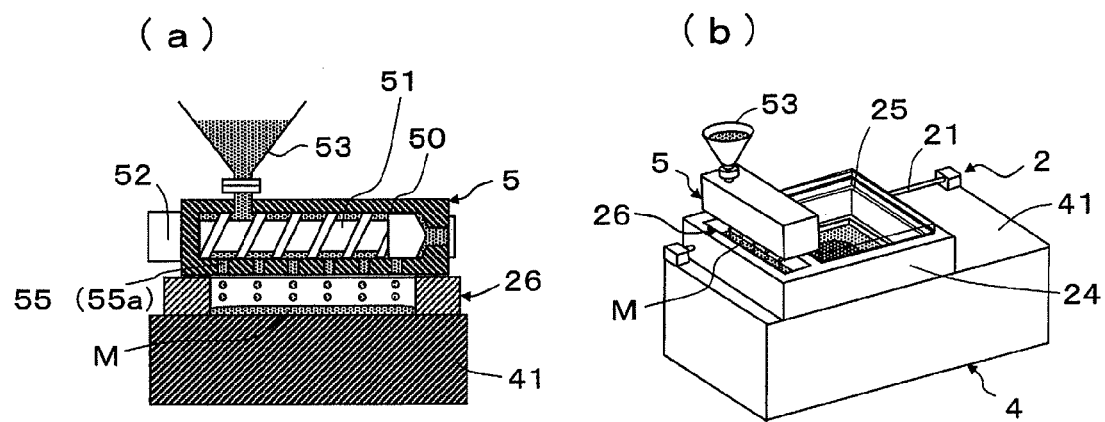
FIG. 7(a) is a sectional side view of stacked-layers forming device according to the fourth embodiment of the present invention.
FIG. 7(b) is a perspective view of stacked-layers forming device according to the fourth embodiment of the present invention.
Figure 8:
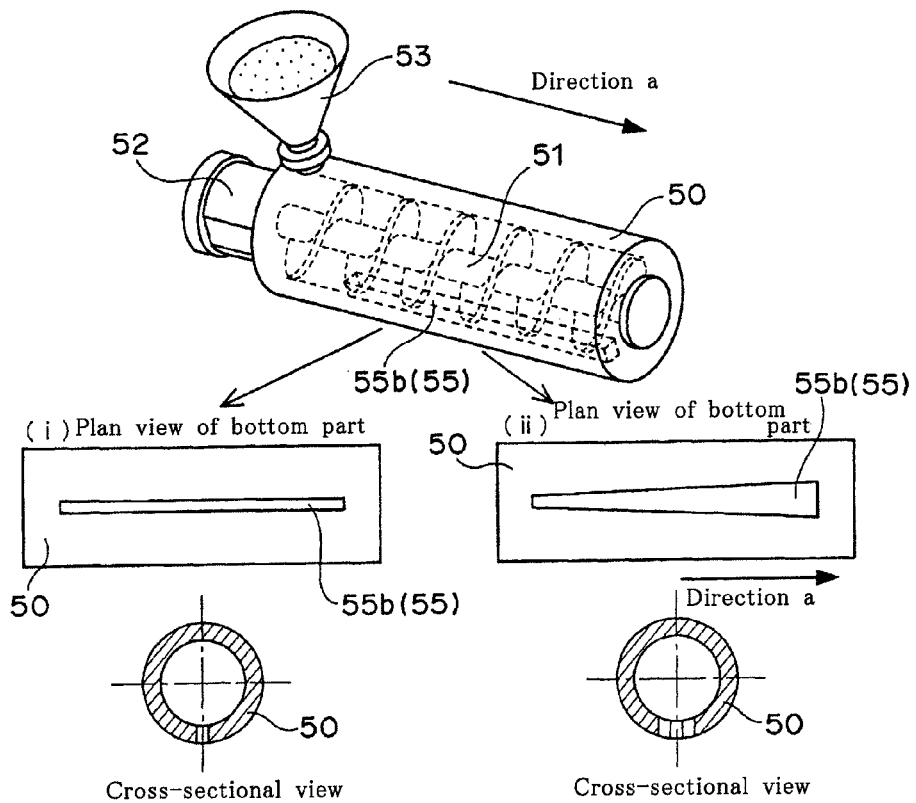
FIG. 8 is perspective view of powder replenishing means of stacked-layers forming device according to the fourth embodiment of the present invention, and a plan view of the bottom part thereof and a vertical sectional view thereof.

With reference to FIGS. 7(a) and 7(b) as well as FIG. 8, a stacked-layers forming device according to the fourth embodiment of the present invention will be now described. In the stacked-layers forming device 1 according to the fourth embodiment, the powder material is supplied via the powder outlet opening which is provided in a barrel (particularly "body") of the approximately cylindrical member. Namely, the powder replenishing means 5 supplies the powder material M via the powder outlet opening 55 of the barrel of the approximately cylindrical member 50. Preferably, as shown in FIGS. 7(a) and 7(b), the powder material M is supplied via a plurality of openings 55a (for example, the number of the openings being 2 to 30) provided at the bottom part of the barrel of the approximately cylindrical member 50. The other configurations/constructions of the fourth embodiment of the present invention are basically similar to those of the first embodiment to the third embodiment. However, as with the third embodiment described above, the device is preferably configured to supply the powder material M into the powder-supply frame 26 to prevent the supplied powder material M from spattering or scattering on the upper surface of the base frame 41 (see FIG. 7(b)). In this case, the powder replenishing means 5 and the powder-supply frame 26 may be integrated with each other as necessary. Examples of the sectional shape (taken perpendicularly with respect to the direction of the powder supply) of each opening 55a include, but are not limited to, circular, oval and polygonal shapes. It is preferred that the sizes of a plurality of openings 55a (i.e. sizes of the sectional shape of openings 55a) are gradually larger from the storage tank 53-sided one end of the approximately cylindrical member to the other end thereof in a direction approximately perpendicular to the sliding direction of the powder-supply frame 26 (slide member 20). In this case, the uniform distribution of the powder material M to above the base 40 or onto the upper surface of the base frame 41 is achieved, and thereby the ununiform supply of the powder material M near the tank 53-sided region is prevented.

As shown in FIG. 8, the powder outlet opening 55 according to the fourth embodiment may be in a form of slit 55 b which is provided at the bottom part of the barrel of the approximately cylindrical member 50 (particularly see the bottom part of the approximately cylindrical member 50 shown in FIGS. 8(i) and 8 (ii)). As with "a plurality of openings 55a", it is preferred that a slit width of the slit opening 55b (i.e. (shorter dimension of the slit opening) is gradually larger from the storage tank 53-sided one end of the approximately cylindrical member to the other end thereof in a direction (direction "a") approximately perpendicular to the sliding direction of the powder-supply frame 26 or the slide member 20 (see FIG. 8 (ii)). In this case, the uniform distribution of the powder material M to above the base 40 or onto the upper surface of the base frame 41 is achieved, and thereby the ununiform supply of the powder material M near the tank 53-sided region is prevented. Even in the case of the slit opening 55b, it is preferred that the stacked-layers forming device is configured to supply the powder material M into the powder-supply frame 26 in order to prevent the powder material M from spattering or scattering on the upper surface of the base frame 41, which is similar to that of the third embodiment. In this case, the powder replenishing means 5 and the powder-supply frame 26 may be integrated with each other.

According to the fourth embodiment, a wide spread of supply of the powder material M with respect to the region above the base 40 or the upper surface of the base frame 41 is achieved without moving the powder replenishing means 5. In other words, the supply of the powder material M is conducted while keeping the powder replenishing means 5 in place, wherein a region range on which the powder material M can be supplied corresponds to the length of the barrel of the approximately cylindrical member 50. This means that the reduced movement of the powder replenishing means 5 is achieved upon the supply of the powder material.

Figure 9:
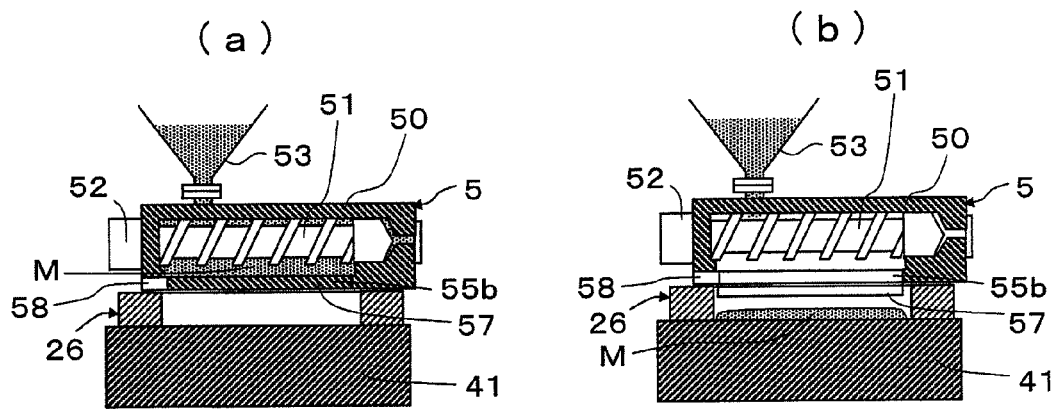
FIGS. 9(a) and (b) are a modified example of sectional side views of stacked-layers forming device according to the fourth embodiment of the present invention.

According to a modified example of the fourth embodiment, as shown in FIGS. 9(a) and 9(b), the powder replenishing means 5 is equipped with "powder outlet opening 55 (e.g. slit opening 55b as shown in FIGS. 9(a) and 9(b)) provided at the bottom part of the barrel of the approximately cylindrical member 50", "covering member 57 which is capable of opening and closing the powder outlet opening 55" and "actuator 58 for the actuation of the covering member 57". In this case, the powder material M can be supplied through the opening and closing of the powder outlet opening 55 by actuating the covering member 57 by means of the actuator 58. More specifically, at the time of other than the supply of the powder material, the powder outlet opening 55 is closed for preventing the powder material M from leaking, whereas at the time of the supply of the powder material the covering member 57 is forced to move so that the powder outlet opening 55 is kept open. Even in this case, a wide spread of supply of the powder material M with respect to the region above the base 40 or the upper surface of the base frame 41 is achieved without moving the powder replenishing means 5.

Figure 10:
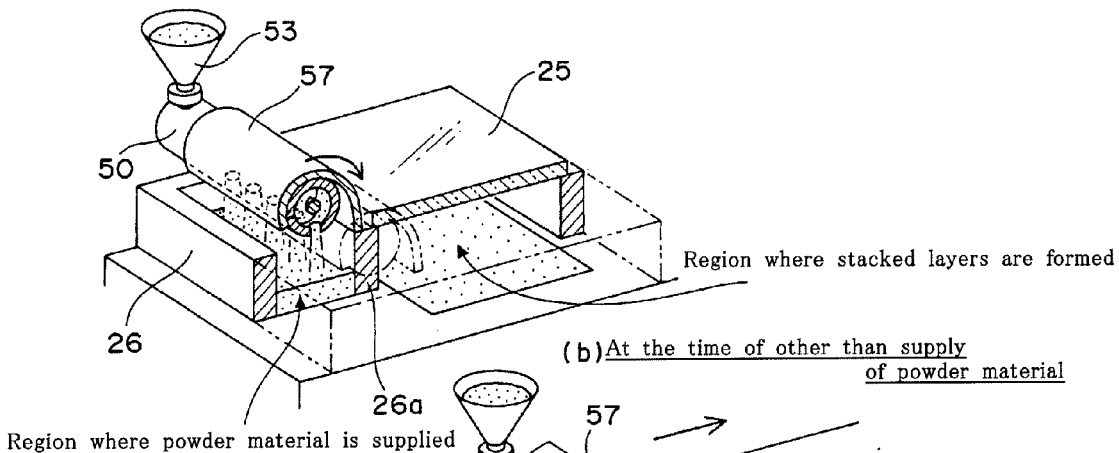
FIGS. 10(a) and (b) are partial sectional side views showing a modified example of stacked-layers forming device according to the fourth embodiment of the present invention.
Figure 10:
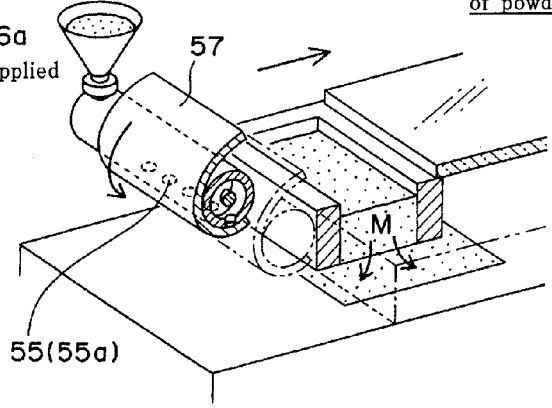

In the modified example of the fourth embodiment, it is preferred that the covering member 57 additionally has a function of preventing the spatter or scatter of the supplied powder material. Specifically, as shown in FIG. 10, it is preferred that the covering member 57 is disposed such that it covers a powder-supply region from above the approximately cylindrical member 50 at the time of supply of the powder material. In other words, it is preferred that at the time of other than the supply of the powder material, the powder outlet opening 55 is covered with the covering member 57 so that the leak of the powder material is prevented (see FIG. 10(b)), whereas at the time of the supply of the powder material the covering member 57 rotates around the approximately cylindrical member to cover a part of the powder-supply region from above (see FIG. 10(a)). In this case, the supplied material is not spattered or scattered to a region where the stacked layers are formed, which leads to an achievement of a more satisfactory manufacturing of the three-dimensional shaped object. For example, the covering of the powder-supply region with the covering member 57 can prevent the spatter or scatter of the supplied powder material onto the window 25, and thereby a reduced transmission of the light beam entering the region where the stacked layers are formed can be prevented. According to a particularly preferred embodiment, the covering member 57 is disposed such that it covers a forming region-sided portion of the powder-supply region from above. In this case, the covering member 57 may function in cooperation with the powder-supply frame 26. Particularly, as shown in FIG. 10(a), the covering member 57 and a forming region-sided edge of the powder-supply frame 26 may collaborate with each other to cover at least of the powder-supply region.

Fifth Embodiment

Figure 11:
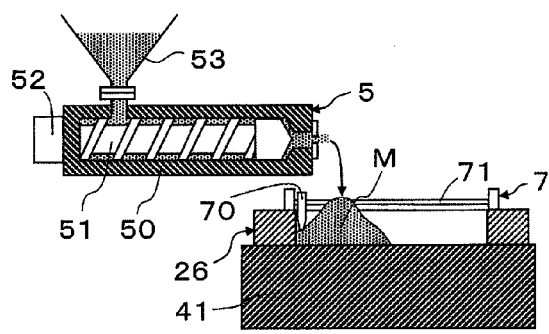
FIGS. 11(a) and 11(b) are sectional side views of stacked-layers forming device according to the fifth embodiment of the present invention.
Figure 11:
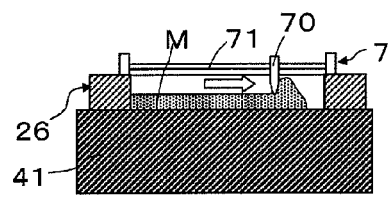

With reference to FIGS. 11(a) and 11(b), a stacked-layers forming device according to the fifth embodiment of the present invention will be now described. The stacked-layers forming device 1 according to the fifth embodiment further comprises a slide mechanism 7 for transferring the powder material M, which has been supplied to above the base 40 or onto the upper surface of the base frame 41, in a direction approximately perpendicular to a sliding direction of the slide member 20. It is preferred that the slide mechanism 7 is configured to have a squeegee blade 70 capable of moving along the rail 71. The slide movement of the squeegee blade 70 along the rail 71 can transfer the powder material M (preferably the powder material M which has been replenished in the powder-supply frame 26) in a direction approximately perpendicular to a sliding direction of the slide member 20, while leveling the surface of the transferred powder material. The slide mechanism 7 may be attached to the base frame 41 or the powder-supply frame 26. The other configurations/constructions of the fifth embodiment of the present invention are basically similar to those of the first embodiment to the fourth embodiment.

According to the fifth embodiment of the present invention, a wide spread of supply of the powder material M with respect to the region above the base 40 or the upper surface of the base frame 41 wherein the surface of the supplied powder material is leveled is achieved without moving the powder replenishing means 5. In other words, the supply of the powder material M is conducted while keeping the powder replenishing means 5 in place, wherein a region range on which the powder material M can be supplied corresponds to the sliding length of the squeegee blade 70. This means that the reduced movement of the powder replenishing means 5 is achieved upon the supply of the powder material.

Figure 12:
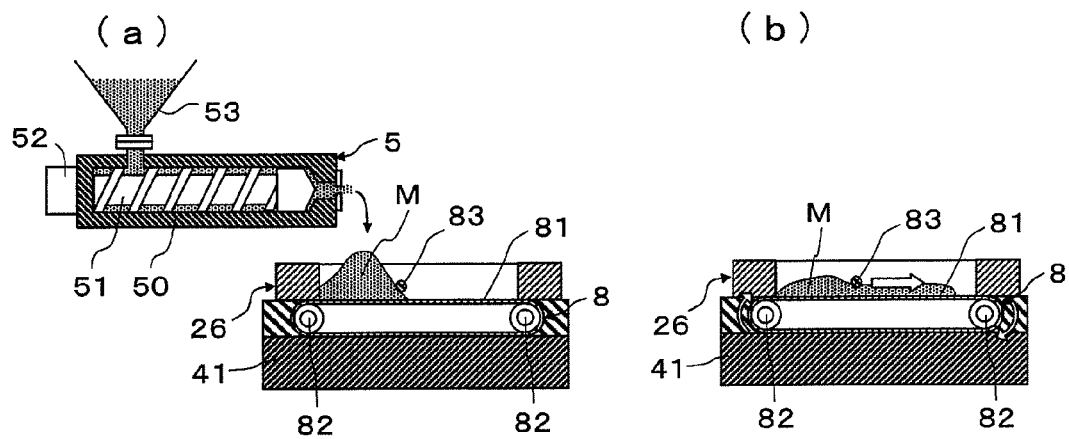
FIGS. 12(a) and 12(b) are a modified example of stacked-layers forming device according to the fifth embodiment of the present invention.

According to a modified example of the fifth embodiment, as shown in FIGS. 12(a) and 12(b), the stacked-layers forming device 1 further comprises a conveyor mechanism 8 for transferring the powder material M, which has been supplied to above the base 40 or onto the upper surface of the base frame 41, in a direction approximately perpendicular to a sliding direction of the slide member 20. It is preferred that the conveyor mechanism 8 is equipped with "belt conveyor 81 which is disposed above the base 40 or on the upper surface of the base frame 41" and "conveyor actuator 82 for actuating the belt conveyor 81". As shown in FIGS. 12(a) and 12(b), the conveyor mechanism 8 may be disposed on the base frame 41. Alternatively, the conveyor mechanism 8 may be configured to move slidably so that it is located above the base 40 or on the upper surface of the base frame 41 only at the time of supply of powder material. Preferably, the powder-supply frame 26 as described above may be applied to this modified example of the fifth embodiment. It is, in this case, preferred that a squeegee blade 83 is secured in the interior of the powder-supply frame 26 such that the blade 83 is oriented in a direction approximately perpendicular to the moving direction of the belt conveyor 81, and thereby the blade 83 serves to level the surface of the conveyed powder material M. As a result, a wide spread of the uniform supply of the powder material M on the upper surface of the base frame 41 is readily achieved without moving the powder replenishing means 5.

Such modified example is suitably applied to the configuration wherein the powder-supply frame 26 is equipped with the lid member 17 (see FIG. 6).

Figure 13:
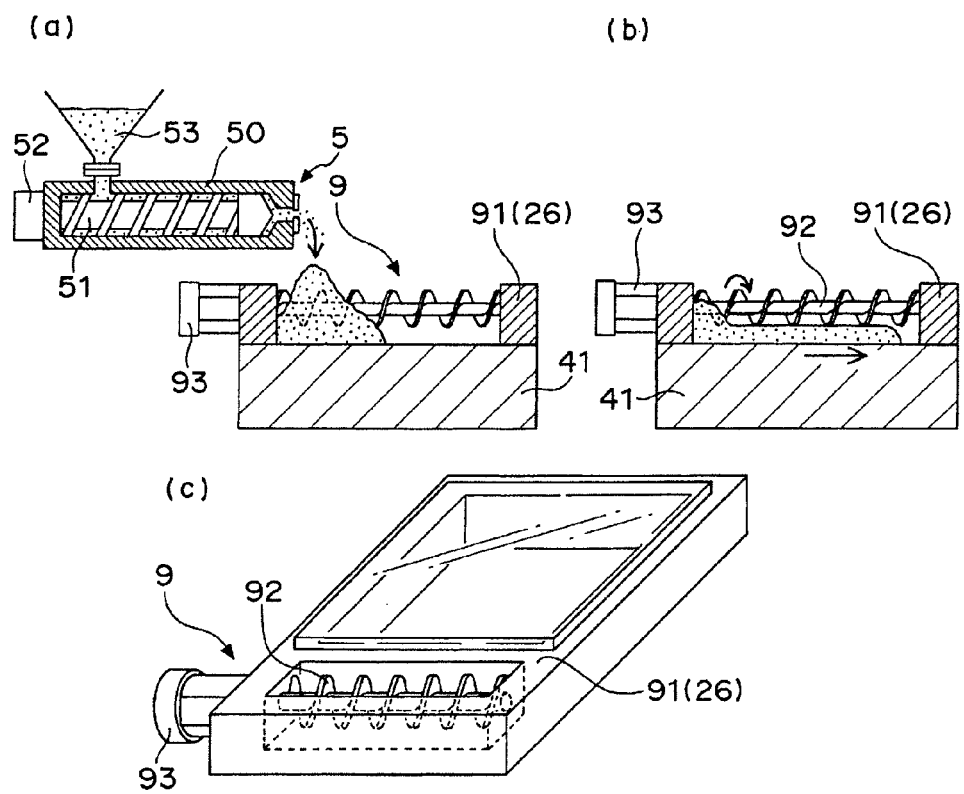
FIGS. 13(a) and 13(b) are a modified example of stacked-layers forming device according to the fifth embodiment of the present invention.
FIG. 13(c) is a perspective view of screw mechanism thereof.
Figure 14:
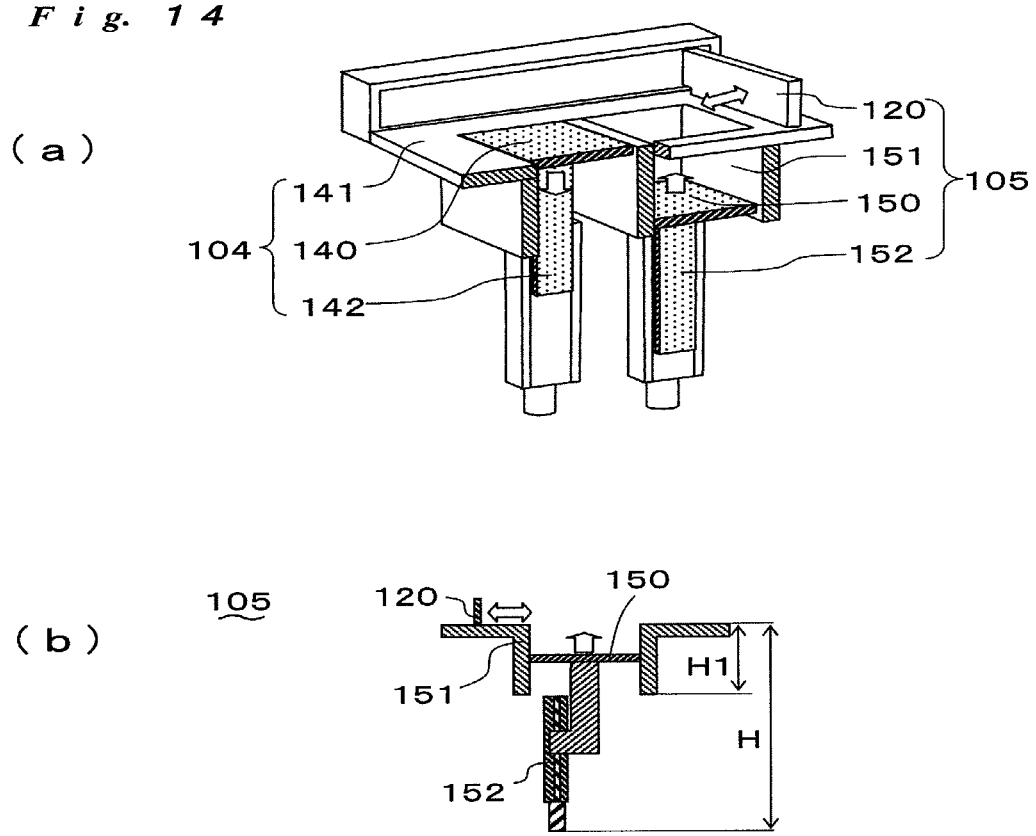
FIG. 14(a) is a partially exploded perspective view of the prior-art stacked-layers forming device.
FIG. 14(b) is a sectional side views of a part for supplying powder material thereof.

According to a further modified example of the fifth embodiment, as shown in FIGS. 13(*a*) and 13(*b*), the stacked-layers forming device 1 further comprises a screw mechanism 9 for transferring the powder material M, which has been supplied to above the base 40 or onto the upper surface of the base frame 41, in a direction approximately perpendicular to a sliding direction of the slide member 20. It is preferred that the screw mechanism 9 is equipped with "screw housing 91 which is disposed above the base 40 or on the upper surface of the base frame 41", "screw 92 which is installed within the housing 91" and "screw actuator 93 for actuating the screw 92". The screw mechanism 9 may be disposed on the base frame 41. Alternatively, the screw mechanism 9 may be configured to move slidably so that it is located above the base 40 or on the upper surface of the base frame 41 only at the time of supply of powder material. As a result, not only a wide spread of the uniform supply of the powder material M on the upper surface of the base frame 41 is readily achieved without moving the powder replenishing means 5, but also a kneading of the powder material M is achieved. The latter is particularly effective when the powder material M has a variation in its particle size or the powder material M is a mixture consisting of different kinds of powders.

It should be noted that the present invention as described above includes the following aspects:

The first aspect: A stacked-layers forming device (or stacked-layers fabrication device) for manufacturing a three-dimensional shaped object, comprising:

a powder layer forming means for forming a powder layer of a powder material; and a solidified layer forming means for forming a solidified layer by irradiating a predetermined portion of the powder layer with a light beam, thereby allowing a sintering of the powder material in said predetermined portion or a melting and solidification thereof, wherein the three-dimensional shaped object with a plurality of the solidified layers stacked integrally is fabricated by repeating the step of forming the powder layer by the powder layer forming means and the step of forming the solidified layer by the solidified layer forming means, the stacked-layers forming device further comprising a powder replenishing means for supplying the powder material to above a base on which the powder layer and the solidified layer are stacked or onto an upper surface of a base frame which surrounds the base, wherein the powder replenishing means comprises an approximately cylindrical member in which the powder material is charged and a screw member which is installed within the approximately cylindrical member, wherein a rotation of the screw member conveys the powder material in the approximately cylindrical member.

The second aspect: The stacked-layers forming device according to the first aspect, wherein the powder layer forming means comprises a slide member which is disposed slidably along the upper surface of the base frame, wherein the slide member is capable of conveying the powder material, which has been supplied from the powder replenishing means, toward an upper surface of the base or thereabove, while leveling the surface of the conveyed powder material.

The third aspect: The stacked-layers forming device according to the second aspect, wherein the slide member comprises a cover part (e.g. cover frame) for capping the upper surface of the base.

The fourth aspect: The stacked-layers forming device according to the second aspect or the third aspect, wherein the slide member comprises a powder-supply frame which surrounds a region or area to which the powder material is to be supplied.

The fifth aspect: The stacked-layers forming device according to any one of the second to the fourth aspects, wherein the powder replenishing means is provided movably in a direction approximately perpendicular to a sliding direction of the slide member, and the powder material is supplied via a powder material outlet disposed in the edge portion of the approximately cylindrical member.

The sixth aspect: The stacked-layers forming device according to the fourth aspect, the powder-supply frame comprises a lid member for covering an upper portion thereof, and a powder material outlet of the approximately cylindrical member is in communication with the interior of the powder-supply frame.

The seventh aspect: The stacked-layers forming device according to any one of the first to the fourth aspects, a powder outlet opening (e.g. "a plurality of openings" or "slit opening") is provided in a barrel of the approximately cylindrical member of the powder replenishing means; and the powder material is supplied via the powder outlet opening.

The eighth aspect: The stacked-layers forming device according to the seventh aspect, the powder replenishing means further comprises a covering member which is capable of opening and closing the powder outlet opening; and the powder material is supplied through the opening and closing of the powder outlet opening by actuating the covering member.

The ninth aspect: The stacked-layers forming device according to any one of the second to the fourth aspects or the sixth aspect, further comprising a slide mechanism for transferring the powder material, which has been supplied to above the base or onto the upper surface of the base frame, in a direction approximately perpendicular to a sliding direction of the slide member.

The tenth aspect: The stacked-layers forming device according to any one of the second to the fourth aspects or the sixth aspect, further comprising a conveyor mechanism for transferring the powder material, which has been supplied to above the base or onto the upper surface of the base frame, in a direction approximately perpendicular to a sliding direction of the slide member.

Although the present invention have been described above, those skilled in the art will understand that the present invention is not limited to the above, and various modifications may be made:

As for the stacked-layers forming device as described above, the movement of the base frame 41 makes it possible to form the powder layer Sa (and thus the solidified layer Sb) without moving the base 40, which leads to a more accurate manufacturing of the three-dimensional shaped object. The present invention, however, is not limited to that. For example, it is possible to lower the base while the base frame is kept in place.

In the above embodiments shown in Figures, the storage tank 32 is secured to the powder replenishing means 5. The present invention, however, is not limited to that. For example, it is possible to use a removable cartridge tank as the storage tank 53.

Furthermore, in the above embodiments shown in Figures, there is provided one screw member installed within the approximately cylindrical member. However, the present invention is not limited to that, and it is possible to provide a plurality of screw members installed within the approximately cylindrical member. In other words, not only a single screw type but also a multi screw type (e.g. twin screw type or triple screw type) can be applied to the powder replenishing means. Just as an example about the twin screw type of the powder replenishing means, the two screws may rotate in the same direction or in the different direction with each other.

INDUSTRIAL APPLICABILITY

The stacked-layers forming device according to present invention can produce various kinds of objects. For example in a case where the powder layer is a metal powder layer and thus the solidified layer corresponds to a sintered layer, the produced three-dimensional shaped object can be used as a metal mold for a plastic injection molding, a press molding, a die casting, a casting or a forging. While on the other hand in a case where powder layer is a resin powder layer and thus the solidified layer corresponds to a cured layer, the produced three-dimensional shaped object can be used as a resin molded part.

CROSS REFERENCE TO RELATED PATENT APPLICATION

The present application claims the right of priority of Japanese Patent Application No. 2008-110281 (filed on Apr. 21, 2008, the title of the invention: "STACKED-LAYERS FORMING DEVICE"), the disclosure of which is incorporated herein by reference.

DESCRIPTION OF REFERENCE NUMERALS

| | |
|---|---|
| 1 | Stacked-layers forming device |
| 2 | Region where powder layer is formed (Powder layer forming means) |
| 20 | Slide member |
| 21 | Horizontal rail |
| 22 | Actuator part for slide member |
| 23 | Cover part |
| 24 | Frame of cover part |
| 25 | Window of cover part |
| 26 | Powder-supply frame |
| 26a | Forming region-sided edge of powder-supply frame |
| 27 | Lid member of powder-supply frame |
| 3 | Optical device (solidified layer forming means) |
| 31 | Optical source |
| 32 | Scanning device |
| 33 | Optical fiber |
| 4 | Forming region (Region where stacked layers are formed) |
| 40 | Base |
| 41 | Base frame |
| 42 | Table |
| 43 | Elevating/descending machine |
| 44 | Pedestal |
| 5 | Powder replenishing means (Powder replenishing machine) |
| 50 | Approximately cylindrical member |
| 51 | Screw member |
| 52 | Actuator part for rotation |
| 53 | Storage tank |
| 54 | Powder material outlet |
| 55 | Powder outlet opening which is provided in barrel of approximately cylindrical member |
| 55a | A plurality of openings |
| 55b | Slit opening |
| 57 | Covering member |
| 58 | Actuator part for covering member |
| 6 | Milling machine |
| 61 | Headstock |
| 62 | Spindle head |
| 63 | End mill |

-continued

DESCRIPTION OF REFERENCE NUMERALS

| | |
|---|---|
| 7 | Slide mechanism |
| 70 | Squeegee blade |
| 71 | Rail for squeegee blade |
| 8 | Conveying mechanism |
| 81 | Belt conveyor |
| 82 | Actuator part for conveyor |
| 83 | Squeegee member |
| 9 | Screw mechanism |
| 91 | Screw housing |
| 92 | Screw |
| 93 | Actuator part for screw |
| 104 | Forming region |
| 140 | Forming table |
| 141 | Frame of forming table |
| 142 | Elevating/descending machine |
| 105 | Region where powder material is supplied |
| 150 | Elevating/descending table |
| 151 | Storage tank |
| 152 | Elevating/descending mechanism |
| L | Light beam |
| M | Powder material |
| Sa | Powder layer |
| Sb | Solidified layer |

The invention claimed is:

1. A stacked-layers forming device for manufacturing a three-dimensional shaped object, comprising:
a powder layer former that forms a powder layer of a powder material; and
a solidified layer former that forms a solidified layer by irradiating a predetermined portion of the powder layer with a light beam, thereby allowing a sintering of the powder material in said predetermined portion or a melting and solidification thereof;
wherein the three-dimensional shaped object with a plurality of the solidified layers stacked integrally is manufactured by repeating the forming the powder layer by the powder layer former and the forming the solidified layer by the solidified layer former;
the device further comprising a powder replenisher that supplies the powder material to above a base on which the powder layer and the solidified layer are formed or onto an upper surface of a base frame which surrounds the base;
wherein the powder replenisher comprises an approximately cylindrical member in which the powder material is charged and a screw member which is installed within the approximately cylindrical member, wherein a rotation of the screw member conveys the powder material in the approximately cylindrical member,
wherein the powder layer former comprises a slide member which is provided slidably in a sliding direction along the upper surface of the base frame,
wherein the slide member is capable of conveying the powder material, which has been supplied from the powder replenisher, toward an upper surface of the base or thereabove, while leveling the surface of the conveyed powder material,
wherein the slide member comprises a frame member, the powder replenisher supplying the powder material inside the frame member,
wherein the powder replenisher is provided movably in a direction approximately perpendicular to the sliding direction of the slide member.

2. The stacked-layers forming device according to claim 1, wherein the slide member comprises a cover part for capping the upper surface of the base.

3. The stacked-layers forming device according to claim 1,
wherein the frame member comprises a lid member for covering an interior thereof, and
wherein a powder material outlet of the approximately cylindrical member is in communication with the interior of the frame member.

4. The stacked-layers forming device according to claim 1,
wherein a powder outlet opening is provided in a barrel of the approximately cylindrical member of the powder replenisher; and
wherein the powder material is supplied via the powder outlet opening.

5. The stacked-layers forming device according to claim 4,
wherein the powder replenisher further comprises a covering member which is capable of opening and closing the powder outlet opening; and
wherein the powder material is supplied through the opening and closing of the powder outlet opening by actuating the covering member.

6. The stacked-layers forming device according to claim 1, further comprising:
a mechanism for transferring the powder material, which has been supplied to above the base or onto the upper surface of the base frame, in a direction approximately perpendicular to a sliding direction of the slide member.

* * * * *